March 24, 1942.  D. H. CLEWELL  2,277,509
GRAVITY METER
Filed Feb. 21, 1940
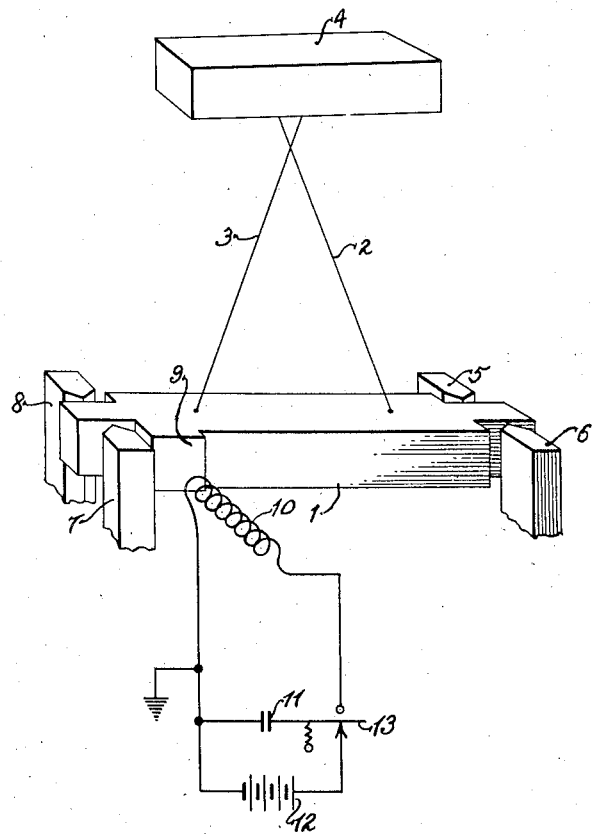
Inventor
Dayton H. Clewell
By
Dallas R. Lamont
Attorney Patented Mar. 24, 1942

2,277,509

UNITED STATES PATENT OFFICE 2,277,509

GRAVITY METER

Dayton H. Clewell, Dallas, Tex., assignor, by mesne assignments, to Socony-Vacuum Oil Company, Incorporated, New York, N. Y., a corporation of New York Application February 21, 1940, Serial No. 320,054

2 Claims. (Cl. 265—1.4)

This invention relates to improvements in gravity meters and more particularly to an improvement in that type of gravity meter in which a mass is resiliently supported from a fixed support and in a very delicately balanced state during its operation and is clamped rigidly in position at other times so that the shock incident to moving it about will not injure it or change its calibration. In particular, the present invention is directed to providing in such a gravity meter a means to reduce the oscillation that is normally occasioned by the release of the clamping means or by some outside disturbance.

It is well-known that gravity meters are extremely sensitive instruments which must be protected against shock or disturbances of any kind, but it is nevertheless necessary to move these instruments from place to place if they are to be used in geophysical exploration, in order that measurements may be made at these different locations. In order that this may be done without injury to the delicate mechanisms or destroying the calibration of the instrument, it has been common to provide the instrument with clamps that clamp the mass in position during transportation, and until the time comes to take a reading. At that time the clamps are released and the mass allowed to come to rest at a position of balance that is indicative of the relative gravitational force being exerted at that particular location. However, the process of coming to rest almost invariably takes a very considerable period of time and often places undesirable strains in the instrument which stretch the supporting wires or in other ways affect its calibration. As the mass of this instrument is in such a delicately balanced state with respect to the torsional elements which support the mass, it cannot be moved or displaced very far from its original position and it is therefore necessary to keep this mass within as small a range of displacement as possible.

Regardless of how carefully the clamps are made that clamp the mass in position, it is almost impossible to release the mass from them without imparting to the mass an impetus that starts it swinging on its resilient support. Being in delicate balance, unless there are damping means provided, the swinging continues for a long period of time. Several types of damping means have been suggested but are generally unsatisfactory, because they not only damp the oscillations of the mass, but they so restrict its movement as to greatly reduce the accuracy of the measurement.

It is well-known to those skilled in the art that better than 50 per cent of the time consumed in taking measurements at each station in the field while conducting gravimetric surveys is attributed to the indefinite period of time required for the oscillating mass to naturally come to rest.

According to the present invention, a new type of damping or centering means is provided which quickly and simply helps to bring the mass to its zero or base position, and yet does this without interfering in any way with the ultimate sensitivity of the device.

This is accomplished by intermittently applying a force to a suspended mass in opposition to the movement of the mass during its oscillation. The repulsive force is applied by an induction coil positioned adjacent to the mass and actuated by a charged condenser in series therewith and the force exists only so long as the transient current from the condenser flows. Since the charge on the condenser dissipates itself through the circuit very rapidly, the repulsive force is applied for only a short period of time and may be regarded as only an impulse. After this force has been applied, the condenser is recharged and the application of force repeated until the mass comes to a zero or "dead beat" position.

In the preferred embodiment only one coil is used and this is positioned adjacent to one end of the mass, although it is quite possible and within the concept of the invention to position a similar circuit on the opposite side of the suspended mass and accomplish the same result. Generally, the charging potential of the condenser will be applied by means of a battery or other source of direct current through a simple push button switch.

In some of the newer gravity meters arrangements are being made so that all readings are taken with the mass in a fixed or base position, the difference in gravitational force being compensated by bringing an additional force to bear on the mass to hold it in the base position. This may be done electromagnetically or electrostatically or by other means which do not form a part of this invention and will not be discussed here. However, when such is the case, the present invention has a particular application in that the mass can be immediately centered and an amount of force applied which is estimated as being sufficient to hold the mass in its centered position. If on observation this force applied is not sufficient to maintain the mass in its centered position, further adjustment in the force applied to the mass can be made and the procedure repeated until the mass remains in its centered or "dead beat" position. Thus accurate determination can be made rapidly without the necessity of waiting each time until the mass comes to rest of its own volition.

Further understanding of the principle of this invention and its specific advantages may be obtained by a consideration of the accompanying drawing and the following detailed description of the drawing. In the drawing only the essential parts of the preferred form of the device are shown in order to simplify the explanation. However, many modifications of the exact structure of the device may be made all within the scope of this invention as may be readily understood by those skilled in the art.

In the drawing the sole figure is a perspective view of a part of a gravity meter embodying the principle of this device.

As shown in the drawing, a mass 1 is supported by torsional elements 2 and 3 from the support 4 and held in place when not in use by clamping members 5, 6, 7, and 8. An optical system not shown may be arranged in any suitable relation to the mass so that its position can be accurately determined at any time and its movement during its oscillation can be followed simply by observation through the optical system. On the side of the mass adjacent to an extremity thereof is attached an electrical conductive plate 9 such as copper or aluminum, and a coil 10 which consists of a number of turns of copper wire is disposed adjacent the plate 9 in such a manner that its axis is perpendicular to the plate 9. The coil 10 is connected in series to a condenser 11. This condenser 11 is charged by means of a battery 12 through a switch 13. The switch 13 may be a push button switch which provides that the circuit connecting the condenser 11 and the battery 12 is always closed except when the coil is energized. When the coil 10 is to be energized, switch 13 is manually operated to close the circuit connecting the coil 10 and the condenser 11. Immediately upon closing the switch the inductance of coil 10 and capacity of condenser 11 enable the charge on condenser 11 to produce a short train of electrical current oscillations in coil 10. This alternating current in coil 10 induces eddy currents in plate 9 so that a repulsive force is exerted between coil 10 and plate 9. The switch 13 is so arranged that when it is released battery 12 is automatically connected to recharge condenser 11.

In operation the clamping member parts 5, 6, 7, and 8 are released and the oscillation of the mass which results from their release is observed through an optical system. By observing through the optical system the movement of the suspended mass, a repulsive force may be applied to the mass by manual operation of the push button switch 13, this force being always applied in opposition to the movement of the mass during its oscillation. In this manner an impulse may be applied to the mass and the result of this impulse viewed through the optical system. Further impulses are then applied until the mass is in its centered or "dead beat" position.

While the preferred embodiment as shown by the drawing includes only one inductive circuit disposed adjacent to one end of the mass, very satisfactory results may be obtained by placing another inductive circuit on the other side of the mass and directly opposite the coil 10 to be operated alternately to speed up the centering of the oscillating mass. Numerous other changes will be immediately apparent to those skilled in the art and it is to be understood that the embodiment shown is only one possible embodiment which has been found particularly advantageous and that many other embodiments may be made all within the scope of the appended claims.

I claim:

1. In a gravity meter in which a mass is resiliently suspended from a support during the measuring process, the improvement that comprises means for producing a damping impulse, said means including an inductive coil fixed to the support, an electrical capacitance, means for electrically charging the capacitance, means for discharging capacitance through inductive coil, and an electro-conductive non-magnetic element attached to the mass adjacent the inductive coil whereby a discharge of the capacitance through the inductive coil will produce a momentary repulsion force between the mass and the inductive coil.

2. In a gravity meter in which a mass is resiliently suspended from a support during the measuring process, the improvement that comprises means for generating a damping impulse, said means including an inductive coil fixed to the support opposite a movable portion of the mass with the axis of said inductive coil being parallel to the direction of motion of said movable portion of the mass, a non-magnetic electrical conducting material fixed to the mass at a point near the inductive coil, an electrical capacitance, a manually operable switch and a battery, all electrically connected together in such manner that the normal rest position of the switch enables the battery to maintain the capacitance in a charged condition until operation of the switch discharges the capacitance through the inductive coil thereby producing a short damped series of current oscillations which induce eddy currents in said conductive member, said eddy currents reacting on the current in the coil to cause a momentary force to repel the mass from the inductive coil.

DAYTON H. CLEWELL.